3,446,605
METHOD FOR PREPARING INORGANIC HYDRIDES OF PHOSPHORUS AND ARSENIC
Albert E. Finholt, 1127 W. 2nd St., Northfield, Minn. 55057
No Drawing. Filed Dec. 24, 1963, Ser. No. 333,176
Int. Cl. C01b 27/00, 25/06
U.S. Cl. 23—365     8 Claims

ABSTRACT OF THE DISCLOSURE

Solutions of compounds having the formula $$MAl(EH_2)_4$$

where M is an alkali metal and E is phosphorus or arsenic, are prepared by bringing phosphine or arsine in contact with a solution of an alkali metal aluminum hydride in tetrahydrofuran or diglyme. The temperatures and pressures used are not critical.

---

This invention relates to novel compounds having the formula $MAl(EH_2)_4$ where M is an alkali metal and E is an element of group five of the periodic table of elements, more particularly phosphorus or arsenic. The invention also relates to methods for preparing such compounds.

These complex hydrides may be used to introduce a group five element bound to hydrogen into inorganic and organic compounds. Examples of this use are the preparations of mono or bis trimethylsilyl phosphines by the re action between the compound $LiAl(PH_2)_4$ and trimethylsilyl chloride. Similarly in an organic application the same phosphorus reagent reacted with ethyl iodide to give ethyl phosphine in 97% yield.

The present invention is based upon the discovery that the hydrides of the elements of group five of the periodic table of elements can be caused to react with the alkali metal aluminum hydrides to form compounds having the formula $MAl(EH_2)_4$ as represented by the equation:

$$MAlH_4 + 4EH_3 \rightarrow MAl(EH_2)_4 + 4H_2 \quad (1)$$

The hydrides of the group five elements must be used in the proportion of at least 4 moles for each mole of alkali metal aluminum hydride. The reaction of phosphine and arsine with the alkali metal aluminum hydrides requires the use of a solvent for the desired product, such as tetrahydrofuran or a glycol ether. The temperatures and pressures are not critical, since the reactions proceed even at pressures below one atmosphere and at temperatures near the boiling point of the hydride of the fifth group element. For more rapid reactions it is preferable to use room temperature or higher and pressures of one atmosphere or higher.

The invention is illustrated further by the following specific examples.

EXAMPLE 1

Phosphine, 30.7 mmoles, was condensed in vacuo on to a solution of 3.89 mmoles of lithium aluminum hydride in 12.3 grams of diglyme. The reactants were warmed to room temperature and were stirred for 19 hours. Over this period hydrogen evolution was slow, phosphine was taken up and the solution turned yellow. Several times during this period the reactants were frozen out in a minus 196° bath for short periods of time while hydrogen was removed. At the end of the run 16.7 mmoles of phosphine was recovered, indicating that 14.0 mmoles had reacted (90 percent). Hydrolysis of the diglyme solution yielded 13.1 mmoles of phosphine (93% recovery) plus some hydrogen. A similar run performed for a shorter period of time established that the amount of hydrogen evolved during the reaction was in a 1:1 ratio to the amount of phosphine which had reacted.

On a larger scale 270 cc. of a 1.5% solution of lithium aluminum hydride in diglyme was placed in a liter flask. Phosphine was introduced in vacuo to about 600 mm. pressure and the mixture was stirred. At intervals the phosphine was trapped with liquid nitrogen, the noncondensible was removed and more phosphine was added. The reaction was allowed to proceed for 152 hours.

An 11.717 gram sample of the large-scale preparation was hydrolyzed to yield 13.3 mmoles of phosphine and 0.2 mmoles of hydrogen. Analysis of the hydrolyzed solution gave 3.61 mmoles of lithium and 3.64 mmoles of aluminum. Phosphorus in the hydrolyzed solution was negligible. The empirical formula indicated by these results was $Li_{1.00}Al_{1.01}(PH_2)_{3.70}$.

EXAMPLE 2

Arsine, 16.1 mmoles, was condensed on to 11.8 mmoles of lithium aluminum hydride dissolved in 24.3 grams of diglyme. On warming to room temperature the solution turned yellow-green and gas bubbles formed. After 2 hours, 6.87 mmoles of hydrogen was collected. The 9.37 mmoles of recovered unreacted arsine indicated that 6.68 mmoles had reacted. This ratio of hydrogen evolved to arsine used up is 0.97. No attempt was made to push the reaction to completion. Hydrolysis of the reaction mixture gave 6.60 mmoles of arsine (99% recovery).

EXAMPLE 3

Ethyl iodide, 13.1 mmoles, was condensed on to a solution of 7.1 mmoles of $LiAl(PH_2)_4$ dissolved in 27 grams of diglyme. As the solution was stirred for 12 hours at room temperature, a solid formed, the liquid became yellow, and 12.4 mmoles of phosphine and 9.1 mmoles of ethyl phosphine were evolved. The reaction mixture was hydrolyzed to yield 4.1 mmoles of phosphine and 3.6 mmoles of ethyl phosphine. The total ethyl group accounted for as ethyl phosphine was 12.7 mmoles (97%).

EXAMPLE 4

Trimethylsilylchloride, 21.9 mmoles, was condensed on to 11.4 mmoles of $LiAl(PH_2)_4$ dissolved in 38.5 grams of diglyme. The mixture was warmed to room temperature. Volatile materials were removed in vacuo after 9 hours and again after 20 hours. Phosphine, 13.8 mmoles, was isolated plus a small amount of a mixture of less volatile materials that were not readily fractionated on the vacuum line. Molecular weights and vapor pressures indicated that the mixture contained mono-(trimethylsilyl)-phosphine and bis-(trimethylsilyl)-phosphine.

In my copending application Ser. No. 333,187, filed Dec. 24, 1963, I have described and claimed methods for preparing compounds represented by the formula $$MAl(NH_2)_4$$

by bringing ammonia in contact with an alkali metal aluminum hydride either in the presence of or in the absence of solvents for said compounds.

I claim:
1. In a method for preparing a solution of an inorganic hydride having the formula $MAl(EH_2)_4$ where M is an alkali metal and E is an element selected from the group consisting of phosphorus and arsenic, the step which comprises bringing a compound having the formula $EH_3$ in contact with a solution of an alkali metal aluminum hydride in the proportion of at least four moles of said compound for each mole of said alkali metal aluminum hydride, the solvent for said solution being a solvent for the inorganic hydride having the formula $MAl(EH_2)_4$ and being selected from the group consisting of tetrahydrofuran and diglyme.

2. The method as claimed by claim 1 wherein the alkali metal is selected from the group consisting of sodium, potassium, and lithium.

3. The method as claimed by claim 2 wherein said element is phosphorus.

4. The method as claimed by claim 2 wherein said element is arsenic.

5. The method as claimed by claim 3 wherein said solvent is diglyme.

6. The method as claimed by claim 3 wherein said solvent is tetrahydrofuran.

7. The method as claimed by claim 4 wherein said solvent is diglyme.

8. The method as claimed by claim 4 wherein said solvent is tetrahydrofuran.

References Cited

UNITED STATES PATENTS

| 2,920,935 | 1/1960 | Finholt | 23—365 |
|---|---|---|---|
| 3,222,122 | 12/1965 | Johnson et al | 23—365 |

OTHER REFERENCES

Bergstrom Journal of the American Chemical Society, vol. 45, pp. 2788–2794 (1923).

Pascal, Noveau Traite DeChimie Minerale, vol. II, part II, pp. 488, 537 (Copyright date is 1963).

Finholt et al. (I), Inorganic Chemistry, vol. 2, pp. 504–507 (June 1963), Copy in Sci. Lib.

Finholt et al. (II), Journal of Inorganic and Nuclear Chemistry, vol. 1, pp. 317–325 (1955), Copy in Sci. Lib.

Wiberg et al., Berichte, col. 92, pp. 2372–2384 (1959), Copy in Sci. Lib.

MILTON WEISSMAN, *Primary Examiner.*